United States Patent
Araujo

[11] Patent Number: 5,315,647
[45] Date of Patent: May 24, 1994

[54] PRIVATE BRANCH EXCHANGE ADAPTED FOR TELEMARKETING

[75] Inventor: Kenneth S. Araujo, Long Branch, N.J.

[73] Assignee: Teleos Communications, Inc., Eatontown, N.J.

[21] Appl. No.: 738,342

[22] Filed: Jul. 31, 1991

[51] Int. Cl.$^5$ .................................... H04M 1/00
[52] U.S. Cl. ................................ 379/265; 379/94; 379/96
[58] Field of Search ............ 379/265, 266, 94, 96, 379/233, 234; 370/110.1

[56] References Cited

U.S. PATENT DOCUMENTS

| | | | |
|---|---|---|---|
| 3,932,709 | 1/1976 | Hoff et al. | 379/96 |
| 3,987,252 | 10/1976 | Vicari | 379/214 |
| 4,048,452 | 9/1977 | Oehring et al. | 379/113 |
| 4,291,198 | 9/1981 | Anderson et al. | 379/96 |
| 4,302,632 | 11/1981 | Vicari et al. | 379/214 |
| 4,355,207 | 10/1982 | Curtin | 379/67 |
| 4,431,870 | 2/1984 | May et al. | 379/354 |
| 4,436,962 | 3/1984 | Davis et al. | 379/211 |
| 4,503,288 | 3/1985 | Kessler | 379/67 |
| 4,535,198 | 8/1985 | Squicciarini | 379/94 |
| 4,591,662 | 5/1986 | Legros et al. | 379/94 |
| 4,656,623 | 4/1987 | Dalby, Jr. et al. | 370/60 |
| 4,694,483 | 9/1987 | Cheung | 379/34 |
| 4,734,931 | 3/1988 | Bourg et al. | 379/93 |
| 4,748,656 | 5/1988 | Gibbs et al. | 379/93 |
| 4,788,682 | 11/1988 | Vij et al. | 370/110.1 |
| 4,805,209 | 2/1989 | Baker, Jr. et al. | 379/96 |
| 4,860,342 | 8/1989 | Danner | 379/96 |
| 4,864,601 | 9/1989 | Berry | 379/96 |
| 4,866,758 | 9/1989 | Heinzelmann | 379/94 |
| 4,928,304 | 5/1990 | Sakai | 379/94 |
| 4,932,022 | 6/1990 | Kenney et al. | 370/60 |
| 4,935,954 | 6/1990 | Thompson et al. | 379/89 |
| 4,942,602 | 7/1990 | Baker, Jr. et al. | 379/212 |
| 4,943,995 | 7/1990 | Daudelin et al. | 379/67 |
| 4,943,996 | 7/1990 | Baker, Jr. et al. | 379/96 |
| 4,949,373 | 8/1990 | Baker, Jr. et al. | 379/96 |
| 4,988,209 | 1/1991 | Davidson et al. | 379/58.2 |
| 5,062,103 | 10/1991 | Davidson et al. | 379/265 |
| 5,185,742 | 2/1993 | Bales et al. | 370/110.1 |

*Primary Examiner*—James L. Dwyer
*Assistant Examiner*—Ahmad F. Matar
*Attorney, Agent, or Firm*—Lerner, David, Littenberg, Krumholz & Mentlik

[57] ABSTRACT

A private branch exchange (PBX) is provided particularly adapted for telemarketing. The PBX contains a virtual terminal interface for effecting outbound telemarketing calls which eliminates the need for a special telephone terminal, interfaced to a host computer, for initiating these calls. A successful call from the virtual terminal interface is immediately connected to an idle agent by the PBX's call handler. The PBX also is provided with a registration terminal interface which eliminates the necessity for the agent to interact with his or her telephone terminal. The registration terminal interface acts as a surrogate signaling part for the physical terminal interface to which the agent's telephone terminal is connected and is controlled by the agent's associated computer terminal. Upon registration of the telephone terminal with the PBX's call handler, all activity in connection with that telephone terminal is controlled by the agent's associated computer terminal.

35 Claims, 6 Drawing Sheets

PRIVATE BRANCH EXCHANGE ADAPTED FOR TELEMARKETING

BACKGROUND OF THE INVENTION

This invention pertains to a private branch exchange (PBX) adapted for telemarketing and, more particularly, to a PBX adapted for controlling a telephone terminal using a computer terminal and for automatically initiating outbound telephone calls without using a telephone terminal.

Telemarketing, the sale of products and services to customers over the telephone, is one of the fastest growing businesses in the United States. In a typical telemarketing installation, telemarketing agents are equipped with a telephone terminal and a computer terminal. The telephone terminal usually is connected to a digital or analog PBX and has a headset, in place of a handset, to free the agent's hands. The computer terminal typically is connected to a host computer having a data base of information used by the agent in conducting the telemarketing operation. This information typically includes data regarding products or services sold by the telemarketing group or pertaining to the accounts or customers serviced by it. The data base may include, e.g., customer telephone numbers, addresses, amounts due, credit card numbers, etc. An agent typically modifies the data base using the keyboard associated with his or her computer terminal, usually while a telephone conversation is ongoing.

Telemarketing may involve principally initiating outbound telephone calls or receiving inbound telephone calls. A typical organization involved in inbound telemarketing is a customer support group, e.g., a group making reservations for an airlines, whose agents answer customers' questions and effect requested transactions. Typical organizations involved in outbound telemarketing include credit collection agencies, whose agents interact with delinquent customers, and companies attempting to sell products through random calling.

The telecommunications equipment presently used to conduct telemarketing comprises a host computer, a PBX and a special telephone terminal controlled by the host computer. For outbound telemarketing, the host computer may run a predictive dialing program. This program assumes that a percentage of calls initiated will be answered and, therefore, initiates more calls than the number of agents available.

Upon selection by the host computer of a particular telephone number for dialing, the number is transmitted to the special telephone terminal. This terminal automatically dials the number by transmitting corresponding DTMF (dual tone, multi-frequency) or other appropriate signals to the PBX. The PBX effects the necessary switching connections, using the public switched telephone network, to the called telephone terminal. When a customer answers, a corresponding signal is transmitted from the special telephone terminal to the host computer which responds with a signal to the special telephone terminal to transfer the call to a particular agent (usually selected on the basis of being idle). The special telephone terminal then transmits appropriate signals to the PBX to cause the PBX to execute the necessary steps to establish a communication path between the called party and the agent. These steps include transmitting an alerting signal to the agent (an auditory or visual signal), receiving an answering signal from the agent (usually initiated by the agent's lifting of the handset on his or her telephone or by activating a key on the telephone's keypad) and then executing the necessary switching connections to establish a communication path from the called party's telephone terminal to the agent's telephone terminal. The multitude of steps involved often result in several seconds of delay between the called party picking up his or her telephone handset and responding with "hello" and a corresponding response from an agent. The called party often hangs up before the agent is on the line.

A further source of inefficiency and expense in telemarketing is the necessity for an agent's simultaneous operation of both a computer terminal and a telephone terminal. The agent must use his or her telephone terminal to make a call, place a call on hold, respond to a call, etc. and must use his or her computer terminal to access the data base pertinent to the call. The telephone commands are transmitted from the telephone terminal to the PBX via DTMF, dial pulse, or other appropriate signals, and interaction with the host computer is via a separate communication path between the agent's computer terminal and the host computer. Although attempts have been made to integrate a telephone terminal and a computer terminal, these attempts merely involve the integration of two key pads into one key pad. In other words, the integration merely involves housing both a computer terminal and a telephone terminal together controlled by a single key pad. In all other respects, the computer functions and telephone functions are identical to those executed by a separate computer terminal and a separate telephone terminal. Thus, when the key pad is used to execute telephone functions, signals are transmitted to the PBX, and when the key pad is used to execute computer functions, signals are transmitted to the computer's central processing unit (CPU) or a host computer. The necessity for continuously dealing with two pieces of equipment is not eliminated and, in addition to the other stresses of telemarketing, this necessity often leads to frustration and a high degree of turnover by agents in this industry.

A PBX used for telemarketing sometimes is connected to an ISDN (integrated services digital network), and, on the inbound side of the PBX, a digital telephone terminal is required to perform the many sophisticated functions involved. Such a terminal is many times more expensive than a standard, analog telephone terminal, particularly a digital telephone terminal capable of performing the functions required for telemarketing. The necessity for such a digital telephone terminal, particularly if many agents are involved, substantially increases the overall cost of telemarketing equipment.

SUMMARY OF THE INVENTION

The present invention provides a system and method for conducting telemarketing which substantially lowers the cost of equipment, minimizes the delay in an agent's response to a successful call and minimizes the physical steps that a telemarketing agent must perform.

A typical PBX comprises a plurality of physical terminal interfaces, a plurality of network interfaces, a switching mechanism and a call handler. Each physical terminal interface provides an interface between the PBX and a terminal within the installation served by the PBX. This terminal typically is a telephone terminal but also may be any device capable of telephonic communication (e.g., a facsimile machine, computer, etc.). Each network interface provides an interface between the PBX and an outside telephone line into the installation served by the PBX. This line may be a standard telephone line, a trunk line, a T-1 digital transmission line (having 24 channels), an integrated services digital network (ISDN) Primary Rate or Basic Rate line, etc. The physical terminal and network interfaces in modern PBXs, such as the Teleos IRX 9000 ™, are modular such that additional interfaces can be added to the PBX as demand for service within the installation grows.

Each physical terminal interface and network interface comprises a signaling part and a voice-data part. The signaling part typically is an algorithm effected by a special purpose digital computer which interacts with the call handler, also typically an algorithm effected by a special purpose digital computer, using an internal PBX signaling format. The signaling part also interacts with the signaling part of an outside switch or internal telephone terminal using one of the standard signaling formats, such as T-1 A/B bit signaling, ISDN Q931 signaling, etc. This signaling is used to effect the various call processing procedures or protocols effected by the PBX, including call set up, call routing, call alerting, call answering, call disconnect, etc. The voice-data part of each physical terminal and network interface comprises all the remaining hardware and software of the interface, i.e., the part involved in the actual transmission of voice or data signals.

The switching mechanism sets up and breaks down communication paths between the physical terminal interfaces and the network interfaces, as directed by the call handler. The switching mechanism also comprises a signaling part and a voice-data part, i.e., a part which effects signaling interaction with the call handler and a part which effects actual communication of voice and data signals through the PBX. The switching mechanism also may be modular, i.e., comprise a plurality of similar modules each of which comprises its own signaling part and its own voice-data part.

The call handler processes all signaling information within the PBX, i.e., all signaling transmitted to or from the network interfaces, physical terminal interfaces and switching mechanisms. In modern PBXs, signaling information also may be transmitted between the call handler and a host computer. The host computer may, e.g., monitor the status of calls handled by the PBX and transmit commands to the call handler.

In accordance with the present invention, a PBX is provided with two additional interfaces, called a "virtual terminal interface" and a "registration terminal interface."

The virtual terminal interface mimics the signals transmitted to the call handler by the signaling part of a physical terminal interface but without initiation by a corresponding signal from a telephone terminal (such as the off hook signal transmitted by a telephone terminal upon picking up the terminal's handset). The registration terminal interface acts as a surrogate signaling part for the signaling part of a registered physical terminal interface. The transmission of a signal to the call handler identifying a particular physical terminal interface, or a telephone terminal connected to that interface, as registered causes the call handler to direct all further signaling information for that physical terminal interface or telephone terminal to the registration terminal interface. The registration terminal interface also mimics the signaling part of a physical terminal interface and interacts with the call handler in the same manner as any other signaling part. Unlike the signaling part of a physical terminal interface, however, and like the virtual terminal interface, the registration terminal interface does not initiate its signaling to the call handler in response to signals from a telephone terminal. The registration terminal interface initiates signaling to the call handler in response to corresponding signals from a computer terminal. The registration terminal and virtual terminal interfaces are effected as signaling algorithms on any of the special purpose digital computers comprising the PBX, preferably the special purpose digital computer comprising the call handler.

In accordance with one aspect of the present invention, a private branch exchange is provided for establishing a telephone call between a first telephone terminal and a second telephone terminal. The PBX comprises a call handler and receiving means, associated with the call handler, for receiving signals from a host computer identifying the first and second telephone terminals. The PBX further comprises first call setup means, associated with the call handler, for transmitting from the call handler a first call setup signal to a virtual terminal interface, and first call answer means, associated with the virtual terminal interface, for transmitting, without initiation by a corresponding signal from a telephone terminal and in response to the first call setup signal, a first call answer signal from the virtual terminal interface to the call handler.

The PBX also comprises second call setup means, associated with the call handler, for transmitting from the call handler a second call setup signal to a network or other destination interface associated with the second telephone terminal, and second call answer means, associated with the destination interface, for transmitting, upon initiation by a corresponding signal from the second telephone terminal, a second call answer signal from the destination interface to the call handler.

The PBX also comprises third call setup means, associated with the call handler, for transmitting from the call handler a third call setup signal to a physical terminal interface associated with the first telephone terminal and third call answer means, associated with the physical terminal interface, for transmitting, upon initiation by a corresponding signal from the first telephone terminal, a third call answer signal from the physical terminal interface to the call handler. Finally, the PBX comprises switching means for establishing, following receipt by the call handler of the third call answer signal, a communication path between the physical terminal interface and the destination interface for the telephone call.

In another aspect of the present invention, a PBX is provided for controlling a telephone terminal through an associated computer terminal. The PBX comprises a call handler and registering means, associated with the call handler, for registering, in response to a registration signal, the telephone terminal for control by the computer terminal.

The PBX also comprises diverting means, associated with the call handler, for diverting to a registration terminal interface, subsequent to the registration of the telephone terminal, first telephone call signaling messages for the signaling part of the physical terminal interface associated with the registered telephone terminal. Call signaling means, associated with the registration terminal interface, are provided for transmitting second telephone call signaling messages to the call handler. These second telephone call signaling messages replace the telephone call signaling messages normally received by the call handler from the signaling part of the physical terminal interface associated with the registered telephone terminal. Finally, receiving means are provided, associated with the registration terminal interface, for receiving command signals, responsive to the computer terminal, which initiate the second telephone call signaling messages.

A further aspect of the present invention provides methods for establishing a telephone call between a first telephone terminal and a second telephone terminal. These methods use a PBX comprising a call handler and include receiving signals by the call handler from a host computer identifying the first and second telephone terminals, registering, in response to a registration signal, the first telephone terminal, and diverting to a registration terminal interface, subsequent to the registering, first telephone call signaling messages for the signaling part of the physical terminal interface associated with the first telephone terminal.

These methods further include transmitting from the call handler a first call setup signal to a virtual terminal interface, and transmitting from the virtual terminal interface to the call handler, in response to the first call setup signal, a first call answer signal, without initiation by a corresponding signal from a telephone terminal. The methods further include transmitting from the call handler a second call setup signal to a network terminal interface associated with the second telephone terminal, and transmitting a second call answer signal from the network terminal interface to the call handler upon initiation by a corresponding signal from the second telephone terminal.

Finally, these methods include transmitting from the call handler a third call setup signal to the registration terminal interface, transmitting a third call answer signal from the registration terminal interface to the call handler, and establishing a communication path between the network interface and the physical terminal interface for the telephone call following receipt by the call handler of the third call answer signal.

Further aspects and features of the present invention will be appreciated from the detailed description below, in connection with the accompanying drawings.

DETAILED DESCRIPTION OF THE PREFERRED EMBODIMENTS

Figure 1:
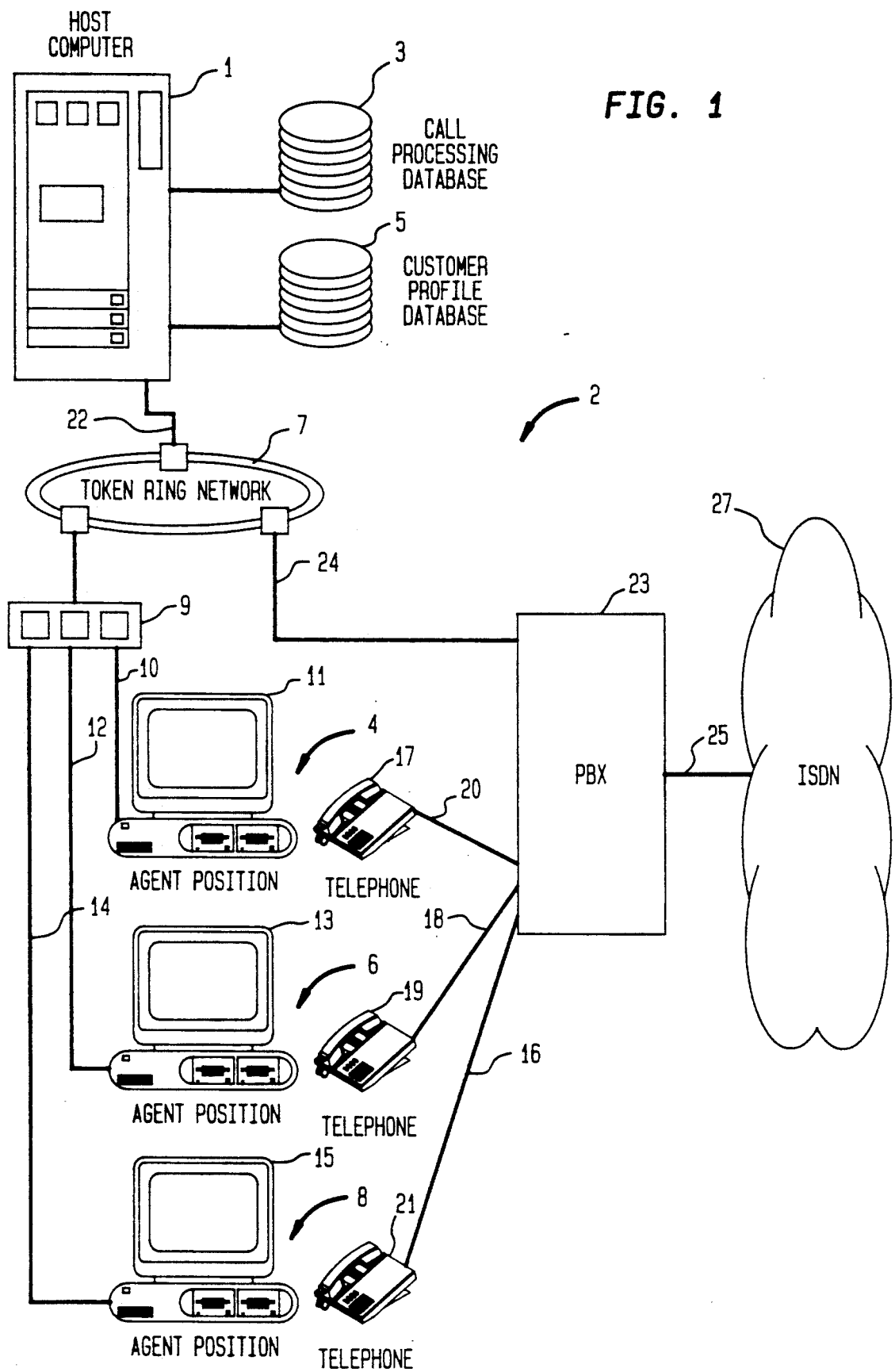
FIG. 1 is a functional block diagram of a telemarketing communications system in accordance with the present invention.

A telemarketing communications system 2 constructed in accordance with the present invention is shown in FIG. 1. This system comprises a plurality of agent positions or agent stations, e.g., agent positions 4, 6 and 8. Each of these positions comprises a computer terminal and an associated telephone terminal, viz., computer terminals 11, 13 and 15, and associated telephone terminals 17, 19 and 21, respectively. Computer terminals 11, 13 and 15 are connected to token ring network 7, via lines 10, 12 and 14, respectively, and junction terminal 9. Telephone terminals 17, 19 and 21 are connected to PBX 23 via lines 20, 18 and 16, respectively.

Telemarketing communications system 2 also comprises host computer 1 and digital private branch exchange (PBX) 23. Host computer 1 and PBX 23 also are connected to token ring network 7 via lines 22 and 24, respectively. Token ring network 7 is a conventional token ring network which manages communication signals between computer terminals 11, 13 and 15, host computer 1 and PBX 23. In the alternative, these communication signals can be effected and managed through RS232, Ethernet, ISDN and other transmission formats or protocols. PBX 23 is connected to integrated services digital network (ISDN) 27 via lines 25. These lines comprise one or more ISDN Primary Rate or Basic Rate digital transmission lines. Lines 25 also may comprise one or more non-ISDN transmission lines, e.g., one or more standard telephone lines, trunk telephone lines, or T-1 digital transmission lines.

Host computer 1 comprises call processing data base 3 and customer profile data base 5. Host computer 1 uses call processing data base 3 to initiate and monitor telephone calls to customers and potential customers which are handled by the.agents at agent positions 4, 6, and 8. Host computer 1 uses customer profile data base 5 to provide to the agents pertinent data regarding the telephone call or the customer called, e.g., name, account number, outstanding balance, etc. Upon request by the agent or, in the alternative, upon receipt by PBX 23 of a signal indicating successful completion of a call, host computer 1 provides these data to the agent's computer terminal for use and updating.

During outbound telemarketing, host computer 1 transmits signals to PBX 23, over line'22, token ring network 7, and line 24, identifying telephone numbers for calling. These numbers may be generated by a random, predictive dialing program. PBX 23 responds by initiating telephone calls to the customers and potential customers over lines 25 and ISDN 27. Since many of these calls are not answered, the number of telephone numbers transmitted to PBX 23 typically is far greater than the number of agents available to handle the calls. When a call is answered, PBX 23 transmits a corresponding signal to host computer 1, over line 24, token ring network 7 and line 22. Host computer 1 responds by consulting call processing data base 3 for the identity of an idle agent and then transmits a signal to PBX 23, over this same communication path, directing PBX 23 to connect the call to the selected agent. Concurrently with this directing, host computer 1 also may transmit data from customer profile data base 5, pertinent to the call or customer, to that agent's computer terminal.

During inbound telemarketing, PBX 23 transmits a signal to host computer 1 indicating the receipt of a call. After consulting call processing data base 3 for the identity of an idle agent, host computer 1 responds with a signal to PBX 23 directing the PBX to connect the call to the selected agent. Concurrently with the transmission of this signal, host computer 1 also may transmit data from customer profile data base 5 to the selected agent's computer terminal pertinent to the call or customer. PBX 23 comprises conventional means for identifying the telephone number of the calling telephone terminal and, therefore, may transmit a signal to host computer 1 identifying this number concurrently with the signal indicating receipt of the call. The particular agent selected by host computer 1 for handling the call, therefore, and the particular data transmitted to that agent concurrently with the connection of the call, may be based upon this signal.

Figure 2:
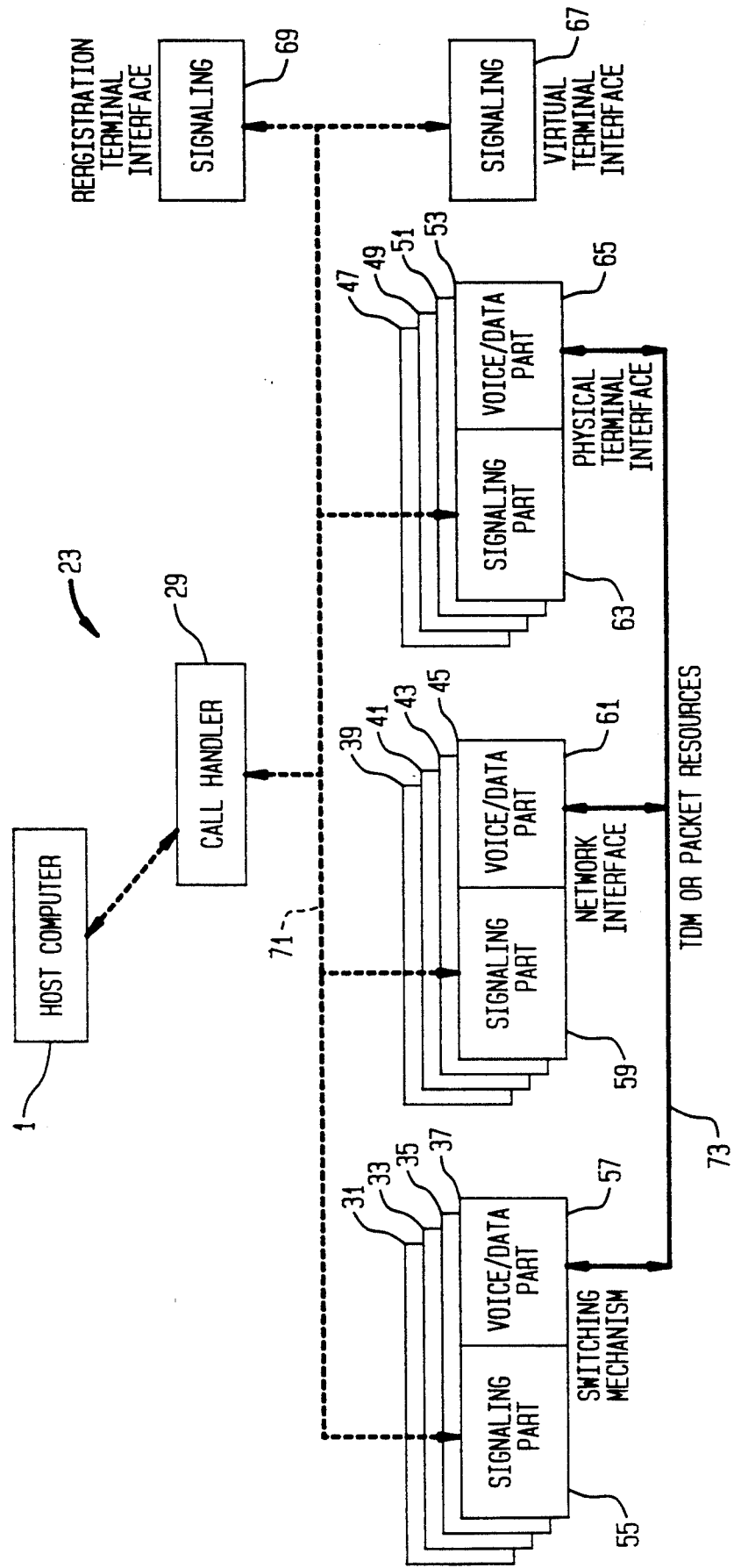
FIG. 2 is a functional block diagram of a private branch exchange in accordance with the present invention.

A functional block diagram of PBX 23 is shown in FIG. 2. PBX 23 comprises a plurality of physical terminal interfaces, e.g., physical terminal interfaces 47, 49, 51 and 53. Each of these interfaces provides a physical connection to one or more terminal devices, e.g., a telephone terminal, computer terminal, facsimile machine, etc., within the installation served by the PBX. In the case of telemarketing communications systems 2, telephone terminals 17, 19 and 21 are connected to physical terminal interfaces 47, 49 and 51, respectively, via lines 20, 18 and 16, respectively.

PBX 23 also comprises a plurality of network interfaces, e.g., network interfaces 39, 41, 43 and 45. Each of these network interfaces provides a physical connection for one of the telephone lines 25 connecting PBX 23 and ISDN 27, such as a trunk line, a T-1 digital transmission line, an ISDN Primary Rate line, etc.

PBX 23 also comprises a plurality of switching mechanisms, e.g., switching mechanisms 31, 33, 35 and 37, which establish communication paths 73 between the physical terminal interfaces and the network interfaces. These paths may be provided through time division multiplexing (TDM), packet resources, and other means. Each particular path is established, at the direction of call handler 29, only for the duration of a call and then is terminated to enable use of the particular switching mechanism, physical terminal interface, and network interface involved for communication paths for other calls.

PBX 23 also comprises call handler 29 which is an algorithm effected by a special purpose digital computer. Call handler 29 manages and processes all of the signaling information within PBX 23, via signaling lines 71. The signaling information within PBX 23 for setting up and breaking down calls is directed to, or transmitted from, call handler 29.

Each physical terminal interface, network interface and switching mechanism comprises a signaling part and a voice-data part. The signaling part of each switching mechanism, e.g., signaling part 55 of switching mechanism 37, comprises all of the hardware and software of that switching mechanism involved in the receipt, creation and transmission of signaling data from or to switching mechanism 37. Similarly, each signaling part of each network and physical terminal interface, e.g., signaling part 59 of network interface 45 and signaling part 63 of physical terminal interface 53, comprises all of the hardware and software of that interface involved in the receipt, creation and transmission of signaling data from or to the interface.

The voice-data parts of the switching mechanisms, network interfaces and physical terminal interfaces, e.g., voice-data parts 57, 61 and 65, of switching mechanism 37, network interface 45, and physical terminal interface 53, respectively, comprise all of the hardware and software of the mechanism or interface involved in the actual transmission of voice and data signals through the communication paths established within the PBX by the signaling parts.

Various signaling protocols or procedures exist for signaling communications within PBXs. These procedures include call set up, call routing, call alerting, call answering, call disconnect, drop call, add call, hold call, transfer call and others. In each case, a particular signaling protocol is effected by call handler 29 and the particular switching mechanism, network interface and/or physical terminal interface involved.

The call set up procedure generally is initiated by a call set up signal transmitted by a network interface or physical terminal interface (originating interface) to the call handler, in response to an incoming call from the outside network or a request to make a call (e.g., an off hook signal) by a telephone terminal served by the PBX. The call setup signal causes the call handler to initiate the call routing procedure or protocol. This procedure includes selection by the call handler of a particular network interface or physical terminal interface (destination interface) to complete the call, the transmission from the call handler to that network interface or physical terminal interface of a second call setup signal, and, if the destination interface is a network interface, the transmission of a signal to a switching mechanism directing the setup of a communication path between the physical terminal interface (originating interface) and the network interface.

If the destination interface is a physical terminal interface, the destination interface responds to the second call setup signal with a call alert signal transmitted to the telephone terminal connected to the destination interface. If the physical terminal interface receives in response an off hook or similar signal, indicating answering of the call, the physical terminal interface then transmits a call answer signal to the call handler. The call handler responds with a signal to a switching mechanism directing the completion of a communication path between the originating interface and the destination interface.

On the other hand, if the destination interface is a network interface, the destination interface responds to the second call setup signal with a corresponding call setup signal transmitted to the outside switch to which the PBX is connected. If this switch is not connected to the called telephone terminal (often the case), a corresponding call setup signal is transmitted, sometimes via intermediate switches, to the outside switch to which this telephone terminal is connected. This outside switch responds, using a similar signaling protocol, with the transmission of a call alert signal to the called telephone terminal and, if this signal is answered, the transmission of a call answer signal back to the PBX's network interface (via the same switch and intermediate switches, if any) and the establishment of a communication path between the called telephone terminal and the network interface. The network interface responds to the call answer signal with a corresponding call answer signal transmitted to the call handler. This corresponding signal notifies the call handler that the call has been connected and that the communication path between the physical terminal interface (originating interface) and network interface should remain established until subsequent signaling indicates otherwise.

The call disconnect protocol generally is initiated by one of the telephone terminals involved in the call, e.g., by an on hook signal. In response, the network interface or physical terminal interface to which the telephone terminal transmitting this signal is connected transmits a call disconnect signal to the call handler which responds with a signal to the switching mechanism directing the break down of the communication path between the interfaces involved in the call.

Using these signaling protocols, host computer 1 can initiate a telephone call (make a call) between a telephone terminal connected to a physical terminal interface and an outside telephone terminal connected to a network interface (through an outside switch or switches). In response to a signal from host computer 1 identifying the telephone terminals, e.g., telephone terminal 21, which is connected to physical terminal interface 51, and the telephone number of the outside telephone terminal, call handler 29, after initiating the call routing protocol, transmits a call setup signal to physical terminal interface 51. Physical terminal interface 51 responds by transmitting a call alert signal to telephone terminal 21 and, if an off hook or similar signal is received, physical terminal interface 51 transmits a call answer signal to call handler 29. Call handler 29 then responds with the same steps that would be executed if the call setup protocol were initiated by a call setup signal transmitted by physical terminal interface 51. Thus, the call routing protocol again is initiated for selecting a particular network interface (destination interface), e.g., network interface 45, to complete the call. Call handler 29 then transmits a call setup signal to network interface 45 and a signal to a switching mechanism, e.g., switching mechanism 37, directing the establishment of a communication path between physical terminal interface 51 and network interface 45. Network interface 45 responds to the call setup signal with the transmission of a corresponding call setup signal, via any intermediate switches, to the outside switch to which the outside telephone terminal is connected. This switch causes the transmission of a call alert signal to the outside telephone terminal and, if the outside telephone terminal answers, the transmission of a corresponding call answer signal to network interface 45 (again via any intermediate switches) and the establishment of a communication path from the outside telephone terminal to this network interface. The establishment of this communication path also completes the communication path to telephone terminal 21. Network interface 45 responds to the call answer signal with the transmission of a corresponding call answer signal to call handler 29. The receipt of this signal notifies call handler 29 that the call has been connected and that the communication path should remain established until subsequent signaling indicates otherwise.

In accordance with the present invention, PBX 23 is provided with two additional interfaces, virtual terminal interface 67 and registration terminal interface 69. In each case, these interfaces consist solely of signaling part and have no corresponding voice-data part. Virtual terminal interface 67 generally mimics the response of a signaling part of a physical terminal interface. Upon receipt of a call setup signal, however, virtual terminal interface 67 always immediately responds with a call answer signal (provided the number of calls being handled by the virtual terminal interface is below a predetermined maximum number), without indication by a corresponding signal from a telephone terminal. Since the signaling part of each physical terminal interface is effected by a special purpose digital computer which provides specified output signals in response to particular input signals, the algorithmic steps of virtual terminal interface 67 can be executed by any of the special purpose digital computers comprising PBX 23. This algorithm, however, preferably is executed by the computer effecting the call handler's functions.

Registration terminal interface 69 also mimics the response of a signaling part of a physical terminal interface and comprises no corresponding voice-data part. In one mode of operation, registration terminal interface 69 operates identically to virtual terminal interface 67, i.e., provides a call answer signal in response to a call setup signal, without initiation by a corresponding signal from a telephone terminal. In a second mode of operation, registration terminal interface 69 transmits signaling data to call handler 29 in response to signals from host computer 1, rather than in response to signals from a telephone terminal. In other words, registration terminal interface 69 treats host computer 1 as if it were the telephone terminal connected to the interface. The signals transmitted by host computer 1 are in response to signals initiated by one of the computer terminals comprising telemarketing communications system 2, i.e, computer terminal 11, 13 or 15. Like virtual terminal interface 67, the algorithmic steps of registration terminal interface 69 can be effected by any of the special purpose digital computers comprising PBX 23. This algorithm, however, preferably also is executed by the computer effecting the functions of call handler 29.

Virtual terminal interface 67 and registration terminal interface 69 appear to call handler 29 like the signaling parts of any of the physical terminal interfaces comprising PBX 23, and call handler 29 interacts with these interfaces in the same manner as a network interface or a physical terminal interface. In one respect, however, this manner of interaction is modified. When dealing with virtual terminal interface 67, call handler 29 does not transmit a signal to a switching mechanism directing the establishment or breakdown of a communication path to or from the virtual terminal interface.

Each signaling part is uniquely identified to the call handler, and this identification protocol is applied consistently to virtual terminal interface 67 and registration terminal interface 69. Upon receipt of a registration signal (a predetermined signal from a telephone terminal or an associated computer terminal) for a particular physical terminal interface and telephone terminal connected to that interface, however, and until that registration signal is cancelled, call handler 29 treats registration terminal interface 69 as if it were the signaling part for the registered physical terminal interface and connected telephone terminal. In other words, upon registration, all signaling data from call handler 29 for that physical terminal interface and telephone terminal is diverted to registration terminal interface 69, and call handler 29 treats the signals from registration terminal interface 69 as if they were the signals from the signaling part for the registered physical terminal interface. Control of this interface, however, is through host computer 1 (in response to a computer terminal) rather than a telephone terminal. Since host computer 1 interfaces with call handler 29, and registration terminal interface 69 and virtual terminal interface 67 are algorithms executed by the computer comprising call handler 29, no additional hardware interfaces are necessary for the virtual and registration terminal interfaces.

Using the make call procedure and virtual terminal interface 67, PBX 23 is uniquely adapted for outbound telemarketing. The steps executed by PBX 23 are illustrated in FIG. 2. Host computer 1 transmits a signal to call handler 29 directing the call handler to make a call between virtual terminal interface 67 and a selected outside telephone terminal. In response, call handler 29 initiates the call routing protocol and transmits a call setup signal to virtual terminal interface 67 (rather than a special telephone terminal). Virtual terminal interface 67 immediately responds with a call answer signal. Call handler 29 responds, therefore, as if a telephone terminal had been picked up in response to a corresponding call alert signal (e.g., an agent had picked up the handset on the telephone terminal and is ready to receive the call) and executes the subsequent steps of the make call procedure.

Call handler 29, therefore, again initiates the call routing protocol and transmits a call setup signal to a network interface (destination interface), e.g., network interface 45. Since call handler 29 is establishing a call between virtual terminal interface 67 and a destination interface, the transmission of a corresponding signal to a switching mechanism is omitted. In response to the call setup signal, network interface 45 transmits a corresponding call setup signal, via any intermediate switches, to the outside switch to which the outside telephone terminal is connected. In response, the outside switch initiates the transmission of a call alert signal to the outside telephone terminal and, if an answering response is received (off hook signal or other appropriate answering response), establishes a communication path between the outside telephone terminal and network interface 45 and transmits a call answer signal (again via any intermediate switches) to this network interface. Network interface 45 responds with the transmission of a corresponding call answer signal to call handler 29. Call handler 29 then transmits a signal to host computer 1 indicating successful completion of the call.

In response to this successful-completion signal, host computer 1 transmits a signal to call handler 29 directing call handler 29 to add a particular idle agent to the call, e.g., the agent using telephone terminal 21 which is connected to physical terminal interface 51. This add procedure can be effected using registration terminal interface 69, as discussed below, or in the same manner that a physical terminal interface (and its associated telephone terminal) is added to any other call. In the latter case, call handler 29 again initiates the call routing protocol and transmits a call setup signal to physical terminal interface 51. Physical terminal interface 51 responds with the transmission of a call alert signal to telephone terminal 21 and awaits a call answer signal from that telephone terminal. If this signal is received, physical terminal interface 51 transmits a call answer signal to call handler 29 which responds with a signal to a switching mechanism, e.g., switching mechanism 37, directing the establishment of a communication path between network interface 45 and physical terminal interface 51. Call handler 29 also responds with a signal to host computer 1 indicating that telephone terminal 21 no longer is idle and that this communication path has been established. In response, host computer 1 transmits a signal to call handler 29 directing call handler 29 to drop virtual terminal interface 67 from the call, and call handler 29 responds with the transmission of a call disconnect signal to virtual terminal interface 67. Virtual terminal interface 67 responds to this signal by decrementing its count of active calls. As stated above, since call handler 29 is transmitting the call disconnect signal to virtual terminal interface 67, call handler 29 does not transmit a corresponding call disconnect signal to a switching mechanism. Since virtual terminal interface 67 requires no switching mechanism resources, any number of calls can be effected between virtual terminal interface 67 and outside telephone terminals in this manner.

Although telephone terminals 17, 19 and 21 comprise headsets (not shown) in addition to, or in lieu of, the conventional handsets, these headsets do not eliminate the necessity for the agent's frequent interaction with his or her telephone receiver for processing calls, i.e., responding to a call alert signal, making a call, placing a call on hold, transferring a call, etc. The necessity to interact with both a telephone terminal and a computer terminal substantially increases the stress involved in working as a telemarketing agent. Registration terminal interface 69 enables an agent to eliminate interaction with his or her telephone receiver during normal activities.

Figure 4:
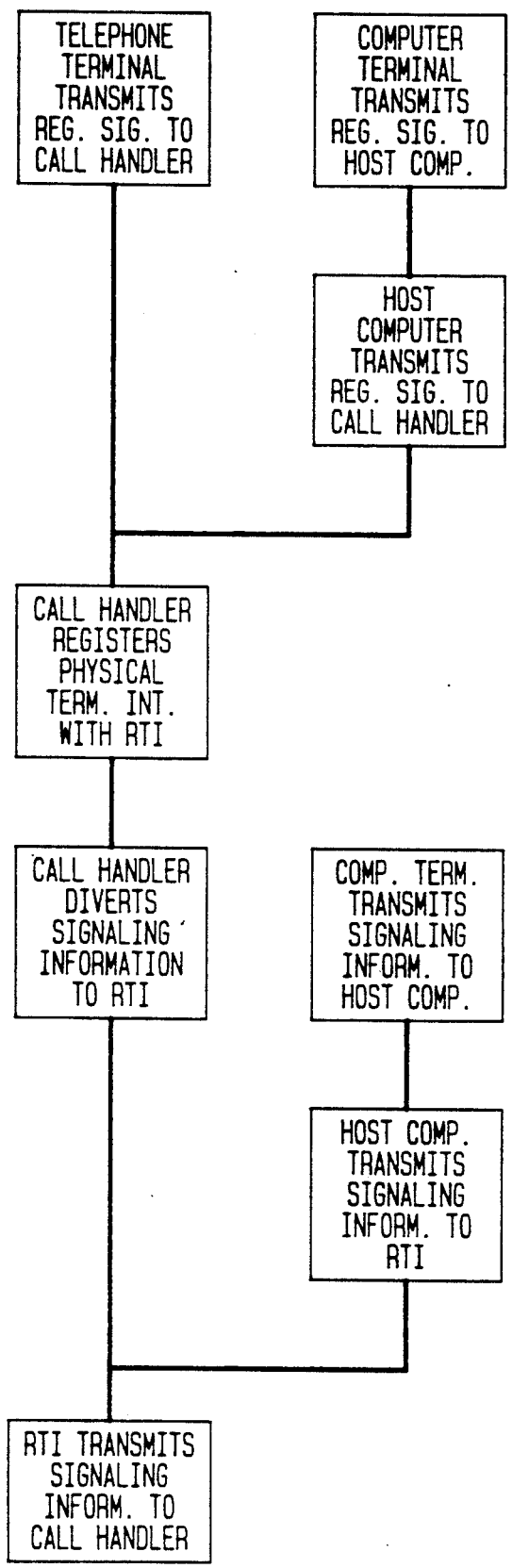
FIG. 4 is a flow diagram for the steps for registering and controlling telephones executed by a private branch exchange comprising a registration terminal in accordance with the present invention.

As illustrated in FIG. 4, using registration terminal interface 69, an agent transmits a signal (registration signal) to call handler 29 registering his or her telephone terminal. This registration signal is transmitted directly from a telephone terminal or via a signal from an associated computer terminal and comprises any predetermined code (combination of digits, symbols, letters, etc.). If effected from a computer terminal, the registration signal is transmitted to host computer 1 which responds with a corresponding registration signal to call handler 29. In either case, upon receipt by call handler 29 of a registration signal for a particular telephone terminal, registration terminal interface 69 is treated by the call handler as if it were the signaling part of the physical terminal interface to which that telephone terminal is connected. Until the registration signal for that telephone terminal is cancelled, therefore, call handler 29 diverts all signaling information for that signaling part to registration terminal interface 69 and treats responding signals from registration terminal interface 69 for that telephone terminal as if transmitted from the signaling part of the physical terminal interface to which that telephone terminal is connected. These responding signals, which are identical to the responding signals transmitted by the signaling part, are initiated by host computer 1 rather than the telephone terminal, and are in response to corresponding signals from the computer terminal associated with the registered telephone terminal.

Figure 5:
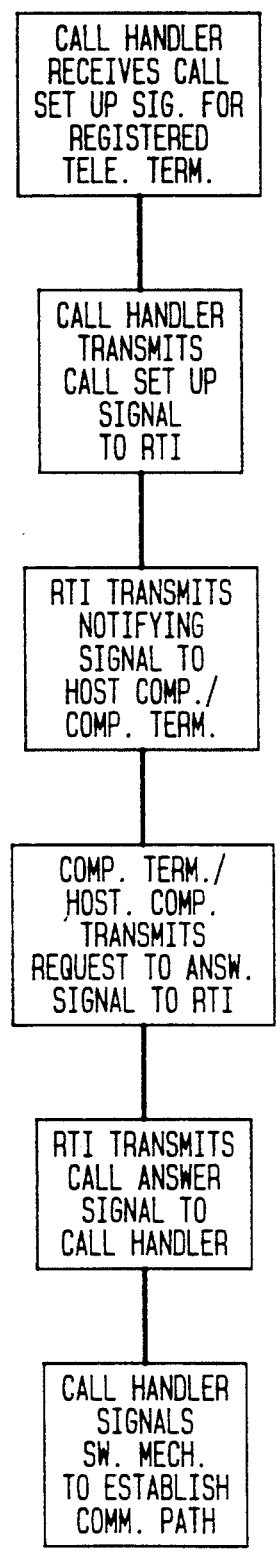
FIG. 5 is a flow diagram for the steps for answering telephone calls executed by a private branch exchange comprising a registration terminal interface in accordance with the present invention.

As illustrated in FIGS. 4 and 5, if call handler 29 receives, e.g., a registration signal for telephone terminal 17, then computer terminal 11 controls, via host computer 1, the signals transmitted to call handler 29 for control of the voice-data part of physical terminal interface 47. Therefore, if a call alerting signal is received by the agent at agent position 4 (which may be an audible signal from telephone terminal 17 or a visual signal on his or her computer screen), the agent responds by activating a key on his or her computer terminal's keypad. Calls are made, placed on hold, and transferred in a similar manner. For example, to make a call, appropriate signals identifying the number to be called are entered at computer terminal 11, and these signals are transmitted to registration terminal interface 69 via host computer 1. Registration terminal interface 69 responds in the same manner and with the same call set up signal to call handler 29 as the signaling part of physical terminal interface 47 and as if telephone terminal 17 had initiated the call.

Registration terminal interface 69 is configured for two types of registration: (a) full control registration as described above; and (b) semi-control registration. The code comprising the registration signal determines which mode of registration is effected. In the semi-control mode, registration terminal interface 69 still looks to host computer 1, and corresponding signals from the computer terminal associated with the registered telephone terminal, to initiate all signaling transmissions to call handler 29, except for a signal in response to a call setup signal. Upon receipt of a call setup signal, registration terminal interface 69, like virtual terminal interface 67, immediately responds with a call answer signal. By selecting the semi-control mode, therefore, agents automatically are connected to telephone calls without any action on their part. This mode eliminates the necessity for an agent's response to a call alert signal through activation of a key on his or her associated computer terminal. In this semi-control mode, host computer 1 provides some visual indication on the agent's computer screen (or audible indication) indicating that a call is about to be connected to the agent. This semi-control mode is particularly well suited for outbound telemarketing because it lessens the time between a called party's response to a call alert signal and an agent's appearance on the line.

Figure 6:
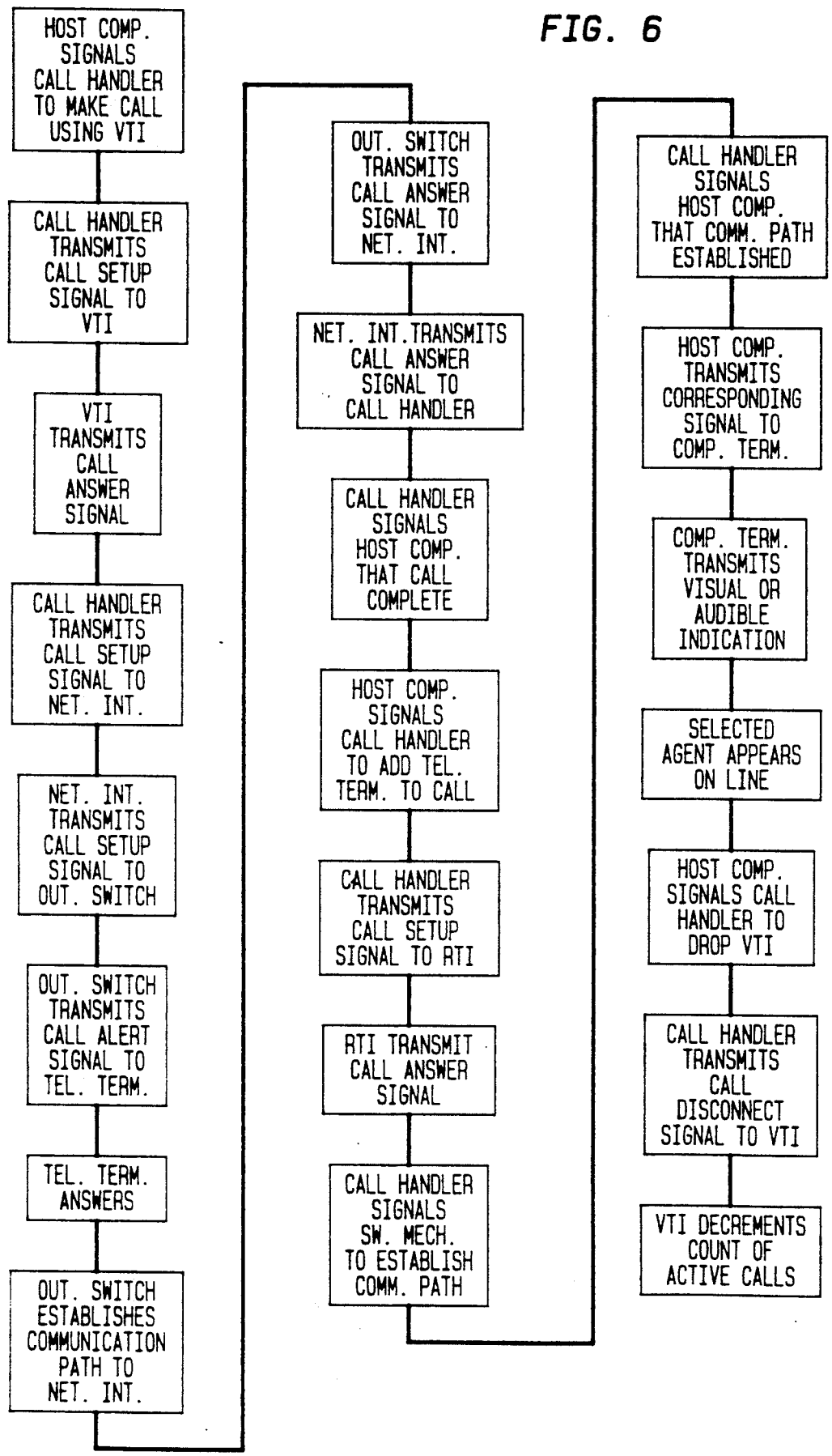
FIG. 6 is a flow diagram for the steps for making telephone calls executed by a private branch exchange comprising both a virtual terminal interface and a registration terminal interface in accordance with the present invention.

In conjunction with virtual terminal interface 67 and the make call procedure, the semi-control mode of operation for registration terminal interface 69 is particularly effective for outbound telemarketing. The steps executed by the system are illustrated in FIG. 6. For such telemarketing, host computer 1 first directs call handler 29 to make a call between virtual terminal interface 67 and a selected outside telephone terminal. In response, call handler 29 initiates the call routing protocol and transmits a call setup signal to virtual terminal interface 67. Virtual terminal interface 67 immediately responds with a call answer signal. Call handler 29, therefore, again initiates the call routing protocol and transmits a call setup signal to the destination network interface which responds with a corresponding call setup signal to the outside switch (via any intermediate switches) to which the outside telephone terminal is connected. If the called party answers, this switch transmits a call answer signal to the destination network interface (again via any intermediate switches) and establishes a communication path between the outside telephone terminal and this interface. The destination network interface responds with a corresponding call answer signal to call handler 29. Call handler 29 then transmits a signal to host computer 1 indicating successful connection of the call. Host computer 1 responds with a signal to call handler 29 directing call handler 29 to add a particular telephone terminal, e.g., telephone terminal 17 to the call. In response, call handler 29 again initiates the call routing protocol and transmits a call setup signal. If call handler 29 has on file a semi-control registration signal for telephone terminal 17, this signal is transmitted, rather than to the signaling part of physical terminal interface 47, to registration terminal interface 69. Registration terminal interface 69 immediately responds to the call setup signal, like virtual terminal interface 67, with a call answer signal. In response, call handler 29 immediately directs a switching mechanism to establish a communication path between the destination network interface and the voice-data part of physical terminal interface 47. Host computer 1 concurrently causes a visual indication to appear on the agent's computer screen (or effects an audible indication), and the agent is able to provide immediately a voice response to the called party. In this mode of operation, the selected agent generally is on the line before the called party can say "hello."

On the other hand, as shown in FIG. 5, if telephone terminal 17 were registered for full control registration, registration terminal interface 69 would transfer no signal to call handler 29 in response to the call setup signal until receipt of an initiating signal from host computer 1. In this mode, registration terminal interface 69 responds to the call setup signal with a corresponding signal to host computer 1, and host computer 1 transmits a corresponding signal to computer terminal 11. If the agent at agent position 4 elects to answer the call, he or she activates a key on the keypad of computer terminal 11 which causes the transmission of a corresponding signal from host computer 1 to registration terminal interface 69. In response, registration terminal interface 69 transmits a call answer signal to call handler 29 which causes call handler 29 to establish a communication path to the voice-data part of physical terminal interface 47 and telephone terminal 17 for the call.

Although particular embodiments of the present invention have been shown and described, many varied embodiments incorporating the teachings of the present invention easily may be constructed by those skilled in the art.

I claim:

1. A private branch exchange for establishing a telephone call between a first telephone terminal and a second telephone terminal, comprising:
   (a) a call handler;
   (b) receiving means, associated with said call handler, for receiving signals from a host computer identifying said first and second telephone terminals;
   (c) first call setup means, associated with said call handler, for transmitting from said call handler a first call setup signal to a virtual terminal interface;
   (d) first call answer means, associated with said virtual terminal interface, for transmitting, without initiation by a corresponding signal from a telephone terminal and automatically in response to said first call setup signal, a first call answer signal from said virtual terminal interface to said call handler;
   (e) second call setup means, associated with said call handler, for transmitting from said call handler a second call setup signal to a destination interface associated with said second telephone terminal;
   (f) second call answer means, associated with said destination interface, for transmitting, upon initiation by a corresponding signal from said second telephone terminal, a second call answer signal from said destination interface to said call handler;
   (g) third call setup means, associated with said call handler, for transmitting from said call handler a third call setup signal to a physical terminal interface associated with said first telephone terminal;
   (h) third call answer means, associated with said physical terminal interface, for transmitting, upon initiation by a corresponding signal from said first telephone terminal, a third call answer signal from said physical terminal interface to said call handler; and (i) switching means for establishing, following receipt by said call handler of said third call answer signal, a communication path between said first telephone terminal and said second telephone terminal for said telephone call.

2. A private branch exchange as in claim 1, further comprising call disconnect means, associated with said call handler, for transmitting, upon initiation by a signal from said host computer, a call disconnect signal to said virtual terminal interface.

3. A private branch exchange as in claim 1, wherein said destination interface comprises a network interface.

4. A private branch exchange as in claim 1, further comprising selecting means associated with said host computer for selecting the identity of said first and second telephone terminals.

5. A private branch exchange as in claim 4, wherein said call handler comprises means for transmitting a status signal to said host computer identifying said first telephone terminal as idle, and wherein said selecting means comprises means for selecting the identity of said first telephone terminal in response to said status signal.

6. A private branch exchange as in claim 4, further comprising a computer terminal associated with said first telephone terminal and data base means associated with said host computer for providing data to said computer terminal regarding said call.

7. A private branch exchange as in claim 6, wherein said call handler comprises means for providing a signal to said host computer indicating the existence of said communication path between said first telephone terminal and said second telephone terminal, and said data base means comprises means for providing said data in response to said signal.

8. A private branch exchange as in claim 1, wherein said virtual terminal interface comprises a signaling algorithm executed by a digital computer.

9. A private branch exchange for controlling a telephone terminal through a computer terminal associated with said telephone terminal, comprising:

(a) a call handler;
(b) registering means, associated with said call handler, for registering, in response to a registration signal transmitted from said telephone terminal or said computer terminal, said telephone terminal for said controlling;
(c) directing means, associated with said call handler, for directing to a registration terminal interface, subsequent to said registering, first telephone call signaling messages for a signaling part of a physical terminal interface associated with said telephone terminal;
(d) signaling means, associated with said registration terminal interface, for transmitting second telephone call signaling messages to said call handler, said second telephone call signaling messages replacing telephone call signaling messages received by said call handler from said signaling part in the absence of said registering; and
(e) receiving means, associated with said registration terminal interface, for receiving command signals responsive to computer signals from said computer terminal, said command signals initiating said second telephone call signaling messages.

10. A private branch exchange as in claim 9, wherein said registration terminal interface comprises a signaling algorithm executed by a digital computer.

11. A private branch exchange as in claim 9, further comprising a host computer, in communication with said computer terminal and said call handler, for initiating said command signals in response to said computer signals.

12. A private branch exchange for establishing a telephone call between a first telephone terinal and a second telephone terminal, comprising:

(a) a call handler;
(b) registering means, associated with said call handler, for registering, in response to a registration signal transmitted from said first telephone terminal or a computer terminal associated with said first telephone terminal, said first telephone terminal;
(c) directing means, associated with aid call handler, for directing to a registration terminal interface, subsequent to said registering, a call setup initiated from said second telephone terminal and intended signal for a signaling part of a physical terminal interface associated with said first telephone terminal;
(d) call answer means, associated with said registration terminal interface, for transmitting a call answer signal from said registration terminal interface to said call handler; and
(e) switching means for establishing, following receipt by said call handler of said call answer signal, a communication path between said first telephone terminal and said second telephone terminal for said telephone call.

13. A private branch exchange as in claim 12, wherein said call answer means comprises means for initiating aid call answer signal without initiation by a corresponding signal from said first telephone terminal and automatically in response to said call setup signal.

14. A private branch exchange as in claim 12, further comprising a computer terminal associated with said first telephone terminal, and wherein said call answer means comprises means for initiating said call answer signal upon initiation by a corresponding signal from said computer terminal in response to said call setup signal.

15. A private branch exchange as in claim 14, further comprising a host computer, in communication with said call handler, and data base means, associated with said host computer, for providing data to said computer terminal regarding said telephone call.

16. A private branch exchange as in claim 15, wherein said call answer means comprises means for initiating said call answer signal upon initiation by a corresponding signal from said host computer in response to said call setup signal.

17. A private branch exchange as in claim 15, wherein aid call handler comprises means for identifying said second telephone terminal and for transmitting a corresponding identifying signal to said host computer, and wherein said host computer comprises means for providing said data in response to said identifying signal.

18. A private branch exchange for establishing a telephone call between a first telephone terminal and a second telephone terminal, comprising:

(a) a call handler;
(b) receiving means, associated with said call handler, for receiving signals from a host computer identifying said first and second telephone terminals;

(c) registering means, associated with said call handler, for registering, in response to a registration signal transmitted from said first telephone terminal or a computer terminal associated with said first telephone terminal, said first telephone terminal for control through a registration terminal interface;

(d) first call setup means, associated with said call handler, for transmitting from said call handler a first call setup signal to a virtual terminal interface;

(e) first call answer means, associated with said virtual terminal interface, for transmitting, without initiation by a corresponding signal from a telephone terminal and automatically in response to said first call setup signal, a first call answer signal from said virtual terminal interface to said call handler;

(f) second call setup means, associated with said call handler, for transmitting from said call handler a second call setup signal to a destination interface associated with said second telephone terminal;

(g) second call answer means, associated with said destination interface, for transmitting, upon initiation by a corresponding signal from said second telephone terminal, a second call answer signal from said destination interface to said call handler;

(h) third call setup means, associated with said call handler, for transmitting from said call handler a third call setup signal to said registration terminal interface;

(i) third call answer means, associated with said registration terminal interface, for transmitting a third call answer signal from said registration terminal interface to said call handler; and (j) switching means for establishing, following receipt by said call handler of said third call answer signal, a communication path between said first telephone terminal and said second telephone terminal for said telephone call.

19. A private branch exchange as in claim 18, wherein said virtual terminal interface and said registration terminal interface comprise signaling algorithms executed by a digital computer.

20. A private branch exchange as in claim 18, wherein said destination interface comprises a network interface.

21. A private branch exchange as in claim 18, further comprising selecting means associated with said host computer for selecting the identity of said first and second telephone terminals.

22. A private branch exchange as in claim 21, wherein said call handler comprises means for transmitting a status signal to said host computer identifying said first telephone terminal as idle, ad wherein said selecting means comprises means for selecting the identity of said first telephone terminal in response to said status signal.

23. A private branch exchange as in claim 18, further comprising a computer terminal, associated with said first telephone terminal, and data base means, associated with said host computer, for providing data to said computer terminal regarding said telephone call.

24. A private branch exchange as in claim 23, wherein said call handler comprises means for providing a status signal to said host computer indicating the existence of said communication path between said first telephone terminal and said second telephone terminal, and said data base means comprises means for providing said data in response to said status signal.

25. A private branch exchange as in claim 18, wherein said third call answer means comprises means for initiating said third call answer signal without initiation by a corresponding signal from said first telephone terminal and automatically in response to said third call setup signal.

26. A private branch exchange as in claim 23, wherein said third call answer means comprises means for initiating said third call answer signal upon initiation by a corresponding signal from said computer terminal in response to said third call setup signal.

27. A method for establishing a telephone call between a first telephone terminal and a second telephone terminal using a private branch exchange with a call handler, comprising:

(a) receiving signals at said call handler from a host computer identifying said first and second telephone terminals;

(b) transmitting from said call handler a first call setup signal to a virtual terminal interface;

(c) transmitting, without initiation by a corresponding signal from a telephone terminal and automatically in response to said first call setup signal, a first call answer signal from said virtual terminal interface to said call handler;

(d) transmitting from said call handler a second call setup signal to a destination interface associated with said second telephone terminal;

(e) transmitting, upon initiation by a corresponding signal from said second telephone terminal, a second call answer signal from said destination interface to said call handler;

(f) transmitting from said call handler a third call setup signal to a physical terminal interface associated with said first telephone terminal;

(g) transmitting, upon initiation by a corresponding signal from said first telephone terminal, a third call answer signal from said physical terminal interface to said call handler; and (h) establishing, following receipt by said call handler of said third call answer signal, a communication path between said first telephone terminal and said second telephone terminal for said telephone call.

28. A method as in claim 27, further comprising transmitting, upon initiation by a signal from said host computer, a call disconnect signal to said virtual terminal interface.

29. A method for controlling a telephone terminal with a computer terminal and a private branch exchange having a call handler, comprising:

(a) registering at said call handler, in response to a registration signal transmitted from said telephone terminal or said computer terminal, said telephone terminal for said controlling;

(b) directing to a registration terminal interface, subsequent to said registering, first telephone call signaling messages for a signaling part of a physical terminal interface associated with said telephone terminal;

(c) transmitting second telephone call signaling messages, from said registration terminal interface to said call handler, in place of telephone call signaling messages received by said call handler from said signaling part in the absence of said registering; and (d) receiving at said registration terminal interface command signals responsive to computer signals from said computer terminal for initiating said second telephone call signaling messages.

30. A method for establishing a telephone call between a first telephone terminal and a second telephone terinal using a private branch exchange with a call handler, comprising:
   (a) registering at said call handler, in response to a registration signal transmitted from said first telephone terminal or a computer terminal associated with said first telephone terminal, said first telephone terminal;
   (b) directing to a registration terminal interface, subsequent to said registering, a call setup signal initiated from said second telephone terminal and intended for a signaling part of a physical terminal interface associated with said first telephone terminal;
   (c) transmitting a call answer signal from aid registration terminal interface to said call handler; and p1
   (d) establishing, following receipt by said call handler of said call answer signal, a communication path between said first telephone terminal and said second telephone terminal for said telephone call.

31. A method as in claim 30, further comprising initiating said call answer signal without initiation by a corresponding signal from said first telephone terminal and automatically in response to said call setup signal.

32. A method as in claim 30, further comprising initiating said call answer signal in response to a corresponding signal from a computer terminal associated with said first telephone terminal.

33. A method for establishing a telephone call between a first telephone terminal and a second telephone terminal using a private branch exchange with a call handler, comprising:
   (a) receiving signals at said call handler from a host computer identifying said first and second telephone terminals;
   (b) registering at said call handler, in response to a registration signal transmitted from said first telephone terminal or a computer terminal associated with said first telephone terminal, said first telephone terminal for control through a registration terminal interface;
   (c) transmitting from said call handler a first call setup signal to a virtual terminal interface;
   (d) transmitting, without initiation by a corresponding signal from a telephone terminal and automatically in response to said first call setup signal, a first call answer signal from said virtual terminal interface to said call handler;
   (e) transmitting from said call handler a second call setup signal to a destination interface associated with said second telephone terminal;
   (f) transmitting, upon initiation by a corresponding signal from said second telephone terminal, a second call answer signal from aid destination interface to said call handler;
   (g) transmitting from said call handler a third call setup signal to said registration terminal interface;
   (h) transmitting a third call answer signal from said registration terminal interface to said call handler; and
   (i) establishing, following receipt by said call handler of said third call answer signal, a communication path between said first telephone terminal and said second telephone terminal for said telephone call.

34. A method as in claim 33, further comprising transmitting said third call answer signal without initiation by a corresponding signal from either said first telephone terminal or a computer terminal associated with said first telephone terminal, and automatically in response to said third call setup signal.

35. A method as in claim 33, further comprising transmitting said third call answer signal in response to a corresponding signal from a computer terminal associated with said first telephone terminal.

* * * * *

UNITED STATES PATENT AND TRADEMARK OFFICE
CERTIFICATE OF CORRECTION

PATENT NO. : 5,315,647
DATED : May 24, 1994
INVENTOR(S) : Araujo

It is certified that error appears in the above-indentified patent and that said Letters Patent is hereby corrected as shown below:

Column 6, line 50, "line'22" should read --line 22--.

Figure 3:
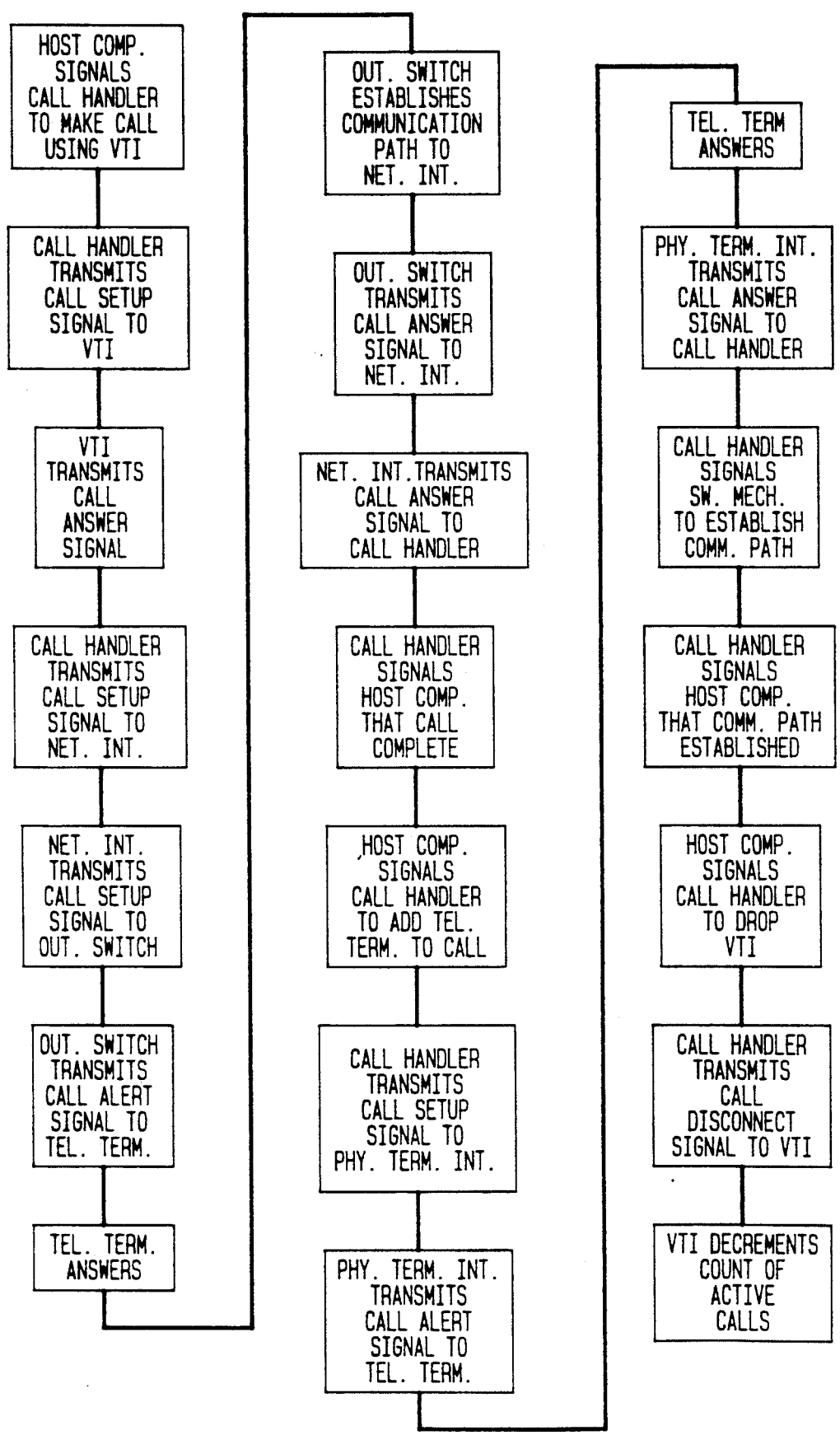
FIG. 3 is a flow diagram for the steps for making telephone calls executed by a private branch exchange comprising a virtual terminal interface in accordance with the present invention.

Column 11, line 7, "FIG. 2" should read --FIG. 3--.

Column 16, line 10, "terinal" should read --terminal--;
line 18, "aid" should read --said--;
line 20, after "setup" insert --signal--;
line 22, delete "signal";
line 36, "aid" should read --said--.

Column 17, line 21, "all" should read --call--;
line 52, "ad" should read --and--;
line 67, "claim 18 should read --claim 28--.

Column 19, line 16, "aid" should read --said--;
line 17, delete "p1".

Column 20, line 17, "aid" should read --said--.

Signed and Sealed this

Thirtieth Day of August, 1994

Attest:

BRUCE LEHMAN

Attesting Officer             Commissioner of Patents and Trademarks